June 20, 1967 M. M. SURI 3,326,339
DEVICE FOR DRIVING AUXILIARIES OF DIESEL LOCOMOTIVES
Filed Oct. 28, 1964
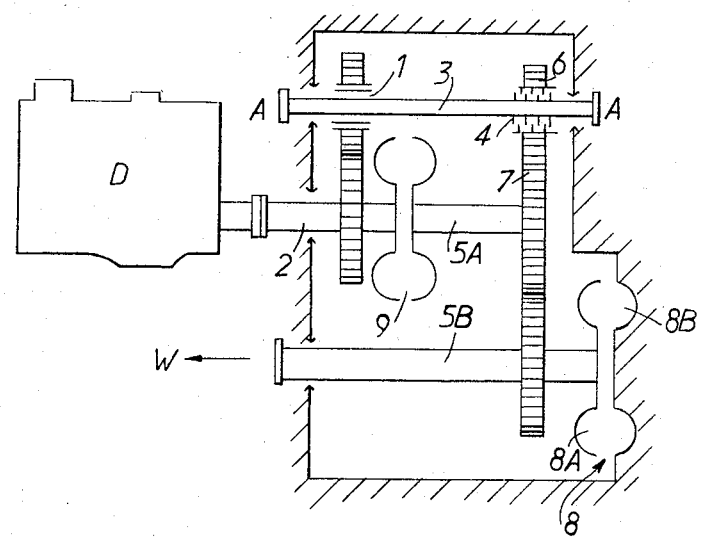
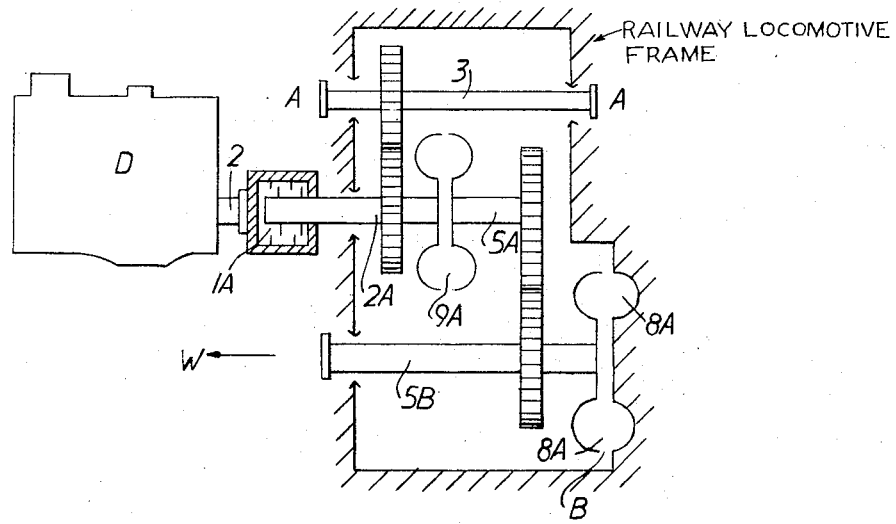
Inventor
Man Mohan Suri
By
Attorneys

United States Patent Office 3,326,339
Patented June 20, 1967

3,326,339
DEVICE FOR DRIVING AUXILIARIES OF DIESEL LOCOMOTIVES
Man Mohan Suri, c/o Research Design and Standardisation Organisation, Ministry of Railways, Alambagh, Lucknow, Uttar Pradesh, India
Filed Oct. 28, 1964, Ser. No. 407,055
Claims priority, application Great Britain, Nov. 12, 1963, 44,635/63
3 Claims. (Cl. 192—4)

This invention relates to more especially but not exclusively to diesel locomotives.

In diesel locomotives dynamic brakes are known. In the case of diesel-electric locomotives dynamic brakes become operative when the diesel engine and the main generator are used to feed current into separately excited fields of the motors mounted on the axles of the locomotive and using the said motors as generators, the resultant current from these motors, thus functioning as generators being taken into a resistance grid where energy is dissipated in the form of heat. In this system it is obvious that assistance is required during the application of dynamic braking from the diesel engine to run the main generator for providing the current into the fields of the motors so that the motors can act as generators with separately excited field. While acting as generators the motors provide braking effort for the locomotive in motion. At the same time, the diesel engine has also to provide power to run all the auxiliaries essential for the satisfactory operation of the locomotive such as compressors, exhausters, radiators, and auxiliary generators for charging of batteries. Normally, to develop full dynamic braking effort in a diesel locomotive it is essential to run the diesel engine of the locomotive at over 25–30% of its rated horsepower for the functions enumerated above, for which reason considerable fuel is expended during the application of dynamic braking.

In the known systems for diesel-hydraulic locomotives the known hydro-dynamic brakes when brought into function dissipate the energy of the wheels by conversion of energy into heat carried with the fluid of the fluid brake. To dissipate this heat generated in the fluid, according to the present practice, techniques similar to those employed on the diesel-electric locomotives are employed, i.e. during the period hydro-dynamic brake is operative, the diesel engine of the locomotive is made to run at 25–30% of its power rating which enables the engine to feed all the various auxiliaries of the diesel locomotive as well as radiator fans that deal with the dissipation of heat generated in the hydro-dynamic brake as well as in the diesel engine cooling water. Here again, in order to provide dynamic braking effort the diesel engine in a diesel locomotive has to expend considerable amount of fuel during the time that hydro-dynamic brake becomes operative.

The purpose of the present invention is to provide a system whereby when the locomotive hydro-dynamic brake is made operative, the assistance necessary from the diesel engine is rendered unnecessary, and all the power required to keep the locomotive operative with all its essential auxiliaries running, as well as to dissipate the heat generated in the hydro-dynamic brake, power is actually taken from the motion of the wheels themselves whereby it becomes possible to apply hydro-dynamic brakes without requiring any fuel to be consumed during the application of the dynamic brake.

As a first essential, in order to provide the system whereby power from the diesel engine is no more required during the application of the dynamic brake, it is necessary that a system be provided whereby the power for driving the auxiliaries during the application of dynamic brakes is obtainable from the wheels in motion. In other words, a system has to be provided wherein the auxiliaries can be operated at option either from the engine or from the wheels. To achieve this objective, the auxiliaries according to the invention are driven through an intermediate driving system which at option is adapted to be operable either from the engine or from the wheels, said system comprising auxiliaries working off a shaft independent of the input transmission shaft, a clutch for causing engagement between the said input shaft and the auxiliaries shaft and a clutch provided on the output shaft (wheel driven shaft), the said clutches being interconnected with means for engaging one of the clutches at a time so that the shaft of the auxiliary devices is driven either from the engine side or from the wheel side at option, through one of the said clutches.

Since one of the objectives of this system is to have the auxiliaries running off the wheels during hydro-dynamic braking, the said clutches in both the input shaft and the output shaft comprise over-running clutches such that when the diesel engine is operative for traction, the input transmission shaft over-running clutch will be engaged while during the application of the hydro-dynamic brake when the wheels provide the energy to the output shaft, the over-running clutch of the output shaft is caused to be engaged thus providing for auxiliaries the necessary power directly from the wheels because at this stage the clutch of the transmission input shaft will be caused to over-run.

However, if positive clutches such as plate clutch or dog clutches are used, then it can be so arranged that during traction the input shaft of the transmission provides the auxiliary shaft with the necessary power through the positive clutch on the input shaft, while the positive clutch on the output shaft is held in a disengaged position; when, however, the dynamic brake is being operated, the clutch on the output shaft is engaged to provide the necessary power to the auxiliaries directly from the wheels while the clutch on the input shaft is held in the disengaged position.

In another construction of a transmission system with hydro-dynamic brake in which the actual transmission circuit includes either a convertor-coupling, or a fluid coupling, a fluid-mechanical coupling, or any other positive coupling the same objective can be achieved more simply by driving the auxiliaries from the primary parts of the transmission while an over-running clutch or a positive clutch is introduced between the diesel engine and the transmission. If then the hydrodynamic brake is operative with any one of the transmission circuits which include either a convertor coupling, a fluid coupling, a fluid-mechanical coupling, or any other positive coupling the same objective can be achieved more simply by driving the auxiliaries from the primary parts of the transmission while an over-running clutch or a positive clutch is introduced between the diesel engine and the said transmission. If now the hydro-dynamic brake is made operative and at the same time the said transmission device is also operative, then it will enable all the auxiliaries to be driven from the primary shaft of the transmission device. The over-running clutch will permit the diesel engine to be left to idle or even shut down.

In all these manners outlined above a hydro-dynamic braking system becomes available for applications, especially in diesel rail traction, where during the functioning of the hydro-dynamic brake, no assistance is necessary from the diesel engine itself, but all the energy for the satisfactory operation of the locomotive and its auxiliaries is provided from the energy available from the motion of the train transferred through the wheels of the locomotive. It is thus obvious that considerable economies in fuel consumption are achieved with this system over the existing systems available for dynamic brakes for diesel-electric locomotives and diesel-hydraulic locomotives.

The invention will now be more fully described with the help of the accompanying drawings which show schematically the principle of the invention.

FIG. 1 is a diagrammatic sectional view showing the application of the invention to a diesel engine driven locomotive, FIG. 2 is a similar diagrammatic view of a modified form of the invention.

Referring to FIG. 1 which shows schematically a transmission system according to this invention the input shaft 2 is connected to the diesel engine D and 5A and 5B comprise the output shafts. The input shaft 2 is engageable, by gear wheels shown, to shaft 3 which drives the auxiliaries marked A through first clutch 1. The clutch 1 may be of the freewheeling or one way type. The output shaft 5A is also engageable to shaft 3 through a second clutch 4 between the shaft 5A and gear wheels 6 and 7. The wheels marked W are driven from the shaft 5B and in turn drive the shaft 5B during braking. The hydro-dynamic brake 8 has its rotating element 8A connected to output shaft 5B while the element 8B is fixed.

Referring to the operation of the system in FIG. 1 in normal traction, the auxiliary shaft 3 is driven from the engine power because clutch 1 is held in engaged position. At this time the dynamic brake is not operative, whereas the power transmission device 9 is operative. However, as soon as the dynamic brake 8 is made operative, clutch 1 is held in disengaged position while clutch 4 is held in engaged position so that the shaft 3 receives the power from the shaft 5B through gear wheels 7 and 6. The transmission device 9, which may be a mechanical coupling, a hydraulic coupling or a hydraulic converter in this embodiment, is made inoperative during the dynamic brake operation, so that the engine is disengaged and may run idle or be shut down.

FIG. 2 shows another embodiment of the invention where the transmission device 9A includes either a converter coupling, a fluid coupling, a fluid mechanical coupling of a positive coupling. A clutch shown at 1A is inserted between the input shaft 2A and the engine D. In normal traction the auxiliary shaft 3 is driven from the engine because clutch 1A is held in the engaged position thereby coupling shafts 2 and 2A and driving the shaft 3 and the shaft 5B connected to the wheels W through the gear wheels shown. At this time the dynamic brake is not operative while the transmission device is operative. As soon as the dynamic brake 8 is made operative, and the clutch 1A is held in disengaged position, the power from the wheels W is transmitted through shafts 5B, 5A transmission device 9A and shaft 2A and the gear wheels shown to the shaft 3 which drives the auxiliaries. The transmission device 9A working in reverse is able to transmit power. Thus at the time of dynamic braking operation, the diesel engine is disengaged from the system and the engine could idle or even be shut down as in the case of FIG. 1, while the auxiliaries driven from shaft 3 are continued in operation.

The distinguishing feature of FIGS. 1 and 2 would be obvious from the fact that while first clutch 1 and second clutch 4 of FIG. 1 are used only to drive the auxiliaries, these clutches have to be designed for a very small part of the total diesel engine power available, for example 10% power of the diesel engine. In the construction of FIG. 2, however, clutch 1A has to be designed for 100% power of the diesel engine. In certain cases, therefore, it would be desirable and more economical to use the construction of FIG. 1 while in certain other cases, it may be possible to use the simpler and more compact construction of FIG. 2. The cross-hatching around the margins of FIGS. 1 and 2 indicate portions of a railway locomotive frame on which the parts specifically described above are mounted.

I claim:
1. A power transmission system for a railway locomotive including employing a diesel engine for motive power wherein the power from the diesel engine is utilized for driving the transmission system connected to the traction wheels of the locomotive and a part of the said engine power is employed for driving the auxiliaries, a system for driving the locomotive traction wheels comprising a transmission device and a coupling, the driven shaft from the said transmission driving the traction wheels of the locomotive, said driven shaft being connected to the rotating element of a hydrodynamic brake, the other element of the hydrodynamic brake being fixed, and a system for driving the auxiliaries selectively either from the engine or from the traction wheels of the locomotive comprising a shaft for driving the auxiliaries, means to connect said shaft with the driving shaft of the engine and means to connect said shaft with the shaft employed for driving the traction wheels of the locomotive, means for disengaging the connection between said shaft for driving the auxiliaries and the driving shaft from the engine and means for connecting said shaft for driving the auxiliaries with the shaft employed for driving the traction wheels of the locomotive whereby the power from the engine is not utilized and the shaft for operating the auxiliaries is driven from the traction wheels of the locomotive.

2. A power transmission system for a railway locomotive including a diesel engine for motive power wherein the power from the diesel engine is utilized for driving the transmission system connected to the traction wheels and a part of the said engine power is employed for driving the auxiliaries, a system for driving the traction wheels of the locomotive comprising a transmission device and a coupling, the driven shaft from the said transmission driving the traction wheels, said driven shaft being connected to the rotating element of a hydrodynamic brake, the other element of the hydrodynamic brake being fixed, and a system for driving the auxiliaries selectively either from the engine or from the traction wheels of the locomotive comprising a shaft for driving the auxiliaries, a first clutch on the said shaft to connect said shaft with the driving shaft of the engine before it is connected to the transmission device and a second clutch on the same shaft with a gear wheel driven from the shaft employed for driving the traction wheels of the locomotive through the transmission device, and means for disengaging the transmission device whereby the power from the engine is not utilized and the shaft operating the auxiliaries is driven from the traction wheels of the locomotive.

3. A locomotive as claimed in claim 2 in which the clutch on the shaft connecting the engine shaft with the input shaft of the transmission device is an overrunning clutch.

References Cited
UNITED STATES PATENTS

| | | | |
|---|---|---|---|
| 2,226,801 | 12/1940 | Black | 192—12 X |
| 2,612,783 | 10/7952 | Brock et al. | 192—48 X |
| 2,616,311 | 11/1952 | Lapsley | 192—12 X |
| 2,827,133 | 3/1958 | Schneider | 192—12 |
| 2,858,675 | 11/1958 | Schneider | 192—3.2 X |
| 2,872,828 | 2/1959 | Brogdon | 192—48 X |
| 3,037,572 | 6/1962 | Ritter | 180—53 X |

BENJAMIN W. WYCHEM, *Primary Examiner.*

DAVID J. WILLIAMOWSKY, *Examiner.*